United States Patent
Côté et al.

(10) Patent No.: US 6,745,372 B2
(45) Date of Patent: Jun. 1, 2004

(54) METHOD AND APPARATUS FOR FACILITATING PROCESS-COMPLIANT LAYOUT OPTIMIZATION

(75) Inventors: Michel Luc Côté, San Jose, CA (US); Philippe Hurat, San Jose, CA (US); Christophe Pierrat, Santa Clara, CA (US)

(73) Assignee: Numerical Technologies, Inc., San Jose, CA (US)

( * ) Notice: Subject to any disclaimer, the term of this patent is extended or adjusted under 35 U.S.C. 154(b) by 0 days.

(21) Appl. No.: 10/116,914

(22) Filed: Apr. 5, 2002

(65) Prior Publication Data

US 2003/0192013 A1 Oct. 9, 2003

(51) Int. Cl.[7] .............................................. G06F 17/50
(52) U.S. Cl. ............................ 716/2; 716/19; 716/20; 716/21
(58) Field of Search ............................. 716/2, 19–21; 703/14–16; 430/5, 30, 311, 313, 316; 700/121; 382/211; 174/257

(56) References Cited

U.S. PATENT DOCUMENTS

| | | | | |
|---|---|---|---|---|
| 5,021,847 A | * | 6/1991 | Eitan et al. ............. | 365/185.16 |
| 5,282,140 A | | 1/1994 | Tazawa et al. .............. | 364/468 |
| 5,326,659 A | | 7/1994 | Liu et al. ....................... | 430/5 |
| 5,680,588 A | * | 10/1997 | Gortych et al. ............... | 716/19 |
| 5,725,974 A | * | 3/1998 | Kawahira ....................... | 430/5 |
| 5,812,412 A | * | 9/1998 | Moriizumi et al. ........... | 716/21 |
| 6,016,357 A | | 1/2000 | Neary et al. ................. | 382/144 |
| 6,078,738 A | | 6/2000 | Garza et al. ........... | 395/500.22 |
| 6,091,845 A | | 7/2000 | Pierrat et al. ................ | 382/144 |
| 6,171,731 B1 | | 1/2001 | Medvedeva et al. ........... | 430/5 |
| 6,225,025 B1 | | 5/2001 | Hoshino .................... | 430/296 |
| 6,272,236 B1 | | 8/2001 | Pierrat et al. ................ | 382/144 |
| 6,339,836 B1 | | 1/2002 | Eisenhofer et al. ............. | 716/5 |
| 6,425,112 B1 | * | 7/2002 | Bula et al. ...................... | 716/5 |
| 6,425,117 B1 | * | 7/2002 | Pasch et al. ................... | 716/21 |
| 6,470,489 B1 | * | 10/2002 | Chang et al. ................. | 716/21 |
| 6,577,994 B1 | * | 6/2003 | Tsukuda ....................... | 703/15 |
| 2002/0019729 A1 | | 2/2002 | Chang et al. .................. | 703/6 |
| 2002/0035461 A1 | | 3/2002 | Chang et al. ................ | 703/13 |
| 2002/0152453 A1 | * | 10/2002 | Rittman ...................... | 716/21 |
| 2002/0155363 A1 | | 10/2002 | Cote et al. ..................... | 430/5 |

FOREIGN PATENT DOCUMENTS

WO      WO 99/14706 A2 A3      3/1999

OTHER PUBLICATIONS

Guterman et al., "An Electrically Alterable Nonvolatile memory Cell Using a Floating Gate Structure", IEEE Journal of Solid Sta Circuit, vol. SC14, No. 2, Apr., 1979, pp. 498–508.*

Balasinski et al, "Comparison of Mask Writing Tools and Mask Simulations for 0.16 UM Devices," IEEE, Dec. 1999, pp. 372–37.*

(List continued on next page.)

Primary Examiner—Vuthe Siek
Assistant Examiner—Naum B Levin
(74) Attorney, Agent, or Firm—Park, Vaughan & Fleming LLP

(57) ABSTRACT

One embodiment of the invention provides a system that simulates effects of a manufacturing process on an integrated circuit to enhance process latitude and/or reduce layout size. During operation, the system receives a representation of a target layout for the integrated circuit, wherein the representation defines a plurality of shapes that comprise the target layout. Next, the system simulates effects of the manufacturing process on the target layout to produce a simulated printed image for the target layout. The system then identifies problem areas in the simulated printed image that do not meet a specification. Next, the system moves corresponding shapes in the target layout to produce a new target layout for the integrated circuit, so that a simulated printed image of the new target layout meets the specification.

32 Claims, 6 Drawing Sheets

OTHER PUBLICATIONS

Pati, Y.C. et al., "Exploiting Structure in Fast Aerial Image Computation for Integrated Circuit Patterns", IEEE Transactions on Semiconductor Manufacturing, vol. 10, No. 1, Feb. 1997, pp. 62–74.*

H. Jinbo, et al. "Application of Blind Method to Phase–Shifting Lithography", IEEE 1992, 1992 Symposium on VLSI Technology Digest of Technical Papers, pp. 112–113.*

Crisalle, O., et al., "A Comparison of the Optical Projection Lithography Simulators in Sample and Prolith", IEEE, Transactions On Semiconductor Manufacturing, vol. 5, No. 1, pp. 14–26, Feb. 1992.*

Technical publication entitled "Challenge for Sub–100–nm DRAM Gate Printing Using ArF Lithography with Combination of Moderate OAI and attPSM," by Young–Chang Kim et al., IMEC, Leuven, Belgium, http://www.imec.be.

Technical publication entitled "Theory and Implementation of a New Interpolation Method Based on Random Sampling," by Wim Schoenmaker et al., IMEC, Leuven, Belgium, http://www.imec.be.

Stimiman, J., et al., "Spatial Filter Models to Describe IC Lithographic Behavior", Precim Corporation, Portland, Oregon (10 pages).

Cobb, et al., "Fast Sparse Aerial Image Calculation for OPC", SPIE, vol. 2621, pp. 534–544, Sep. 20–22, 1995.

Kang, D., et al., "Effects of Mask Bias on t he Mask Error Enhancement Factor (MEEF) of Contact Holes" (11 pages).

Adam, K., et al., "Simplified Models for Edge Transitions in Rigorous Mask Modeling", University of California Berkeley (40 pages).

Gordon, R., et al., "Mask Topography Simulation for EUV Lithography". FINLE Technologies Inc. (15 pages).

Pistor, T., "Rigorous 3D Simulation of Phase Defects in Alternating Phase–Shifting Masks", Panoramic Technology Inc. (13 pages).

Semmier, A., et al., "Application of 3D EMF Simulation for Development and Optimization of Alternating Phase Shifting Masks", Infineon Technologies AG (12 pages).

Erdmann, A., "Topography Effects and Wave Aberrations in Advanced PSM–Technology", Fraunhofer Institute of Integrated Circuits (11 pages).

Neureuther, A., et al., "Modeling Defect–Feature Interactions in the Presence of Aberrations", University of California Berkeley (10 pages).

Mathur, B.P., et al., "Quantitative Evaluation of Shape of Image on Photoresist of Square Apertures", IEEE, Transactions On Electron Devices, vol. 35, No. 3, pp. 294–297, Mar. 1988.

Neureuther, A., "Modeling Phase Shifting Masks", SPIE, 10th Annual Symposium On Microlithography, vol. 1496, pp. 80–85 (1990).

Crisalle, O., et al., "A Comparison of the Optical Projection Lithography Simulators in SAMPLE and PROLITH", IEEE, Transactions On Semiconductor Manufacturing, vol. 5, No. 1, pp. 14–26, Feb. 1992.

Rieger, M., et al., "System for Lithography Proximity Compensation", Precim Company, Portland, Oregon, Sep. 1993 (28 pages).

Pati, Y.C., et al., "Phase–Shifting Masks for Microlithography: Automated Design and Mask Requirements", J. Opt. Soc. Am., vol. 11, No. 9, pp. 2438–2452, Sep. 1994.

Spence, C., et al., "Automated Determination of CAD Layout Failures Through Focus: Experiment and Simulation", SPIE, vol. 2197, pp. 302–313 (1994).

Qian, Q.D., et al., "A New Scalar Planewave Model for High NA Lithography Simulations", IEEE, pp. 45–48 (1994).

Brunner, T., et al., "Approximate Models for Resist Processing Effects", SPIE, vol. 2726, pp. 198–207, Mar. 1996.

Chang, K., et al., "Accurate Modeling of Deep Submicron Interconnect Technology", TMA Times, vol. IX, No. 3 (1997).

Pati, Y.C., et al., "Exploiting Structure in Fast Aerial Image Computation for Integrated Circuit Patterns", IEEE Transactions On Semiconductor Manufacturing, vol. 10, No. 1, pp. 62–74, Feb. 1997.

Brunner, T., "Impact of Lens Aberrations on Optical Lithography", IBM J. Res. Develop., vol. 41, No. 1/2, pp. 57–67, Jan./Mar. 1997.

Tsujimoto, E., et al., "Hierarchical Mask Data Design System (PROPHET) for Aerial Image Simulation, Automatic Phase–Shifter Placement, and Subpeak Overlap Checking", SPIE, vol. 3096, pp. 163–172 (1997).

Kubota, H., et al., "A Fast Method of Simulating Resist Pattern Contours Based on Mean Inhibitor Concentration", Jpn. J. Appl. Phys., vol. 37, pp. 5815–5820 (1998).

Fukuda, H., et al., "Determination of High–Order Lens Aberration Using Phase/Amplitude Linear Algebra", J. Vac. Sci. Technol: B. vol. 17, No. 6, pp. 3318–3321, Nov./Dec. 1999.

Balasinski, A., et al., "A Novel Approach to Simulate the Effect of Optical Proximity on MOSFET Parametric Yield", IEEE, pp. 37.6.1–37.6.4 (1999).

Balasinski, A., et al., "Comparison of Mask Writing Tools and Mask Simulations for 0.16um Devices", IEEE, SEMI Advanced Semiconductor Manufacturing Conference, pp. 372–377 (1999).

Adam, K., "Domain Decomposition Methods For The Electromagnetic Simulation Of Scattering From Three–Dimensional Structures With Applications In Lithography", University of California Berkeley, College of Engineering, Electronics Research.

Anonymous, "Multi–Rail Standard Cell Architecture For Dual Voltage Circuits Or Low Power Application", IPCOM000007555D. Apr. 5, 2002 (8 pages).

Cobb, N., "Fast Optical and Process Proximity Correction Algorithms for Integrated Circuit Manufacturing", Dissertation, University of California at Berkeley, UMI Microform 9902038 (139 pages).

Uhring, W., et al., "Model of an Instrumented Opto–Electronic Transmission System in HDL–A and VHDL–AMS", SPIE, vol. 3893, pp. 137–146, Oct. 1999.

Granik, Y., et al., "Sub–Resolution Process Windows And Yield Estimation Technique Based On Detailed Full–Chip CD Simulation", SPIE, vol. 4182, pp. 335–341 (2000).

* cited by examiner

METHOD AND APPARATUS FOR FACILITATING PROCESS-COMPLIANT LAYOUT OPTIMIZATION

BACKGROUND

1. Field of the Invention

The invention relates to the process of designing an integrated circuit. More specifically, the invention relates to a method and an apparatus for simulating effects of a manufacturing process on an integrated circuit to enhance process latitude and/or reduce layout size.

2. Related Art

Recent advances in integrated circuit technology have largely been accomplished by decreasing the feature size of circuit elements on a semiconductor chip. As the feature size of these circuit elements continues to decrease, circuit designers are forced to deal with problems that arise as a consequence of the optical lithography process that is typically used to manufacture the integrated circuits. This optical lithography process begins with the formation of a photoresist layer on the surface of a semiconductor wafer. A mask composed of opaque regions, which are formed of chrome, and light-transmissive clear regions, which are generally formed of quartz, is then positioned over this photoresist layer coated wafer. (Note that the term "mask" as used in this specification is meant to include the term "reticle.") Light is then shone on the mask from a visible light source, an ultraviolet light source, or more generally some other type of electromagnetic radiation together with suitably adapted masks and lithography equipment.

This light is reduced and focused through an optical system that contains a number of lenses, filters and mirrors. The light passes through the clear regions of the mask and exposes the underlying photoresist layer. At the same time, the light is blocked by opaque regions of the mask, leaving underlying portions of the photoresist layer unexposed.

The exposed photoresist layer is then developed, through chemical removal of either the exposed or non-exposed regions of the photoresist layer. The end result is a semiconductor wafer with a photoresist layer having a desired pattern. This pattern can then be used for etching underlying regions of the wafer.

As feature sizes continue to decrease, optical effects, resist effects, mask writer beam effects, and/or other effects can degrade the quality of the printed image obtained through the optical lithography process. The upper portion of FIG. 1 illustrates how an optical lithography process 102 converts a layout 510 into a printed image 113 on a semiconductor wafer. As mentioned above, this optical lithography process 102 involves: a mask fabrication process 104, an exposure of the mask through stepper optics 106, a photoresist development process 108 and a development or etching process 112. Note that each of these processes can degrade the resulting printed image 113.

A layout of an integrated circuit is typically created in accordance with a set of design rules that specify a number of constraints, such as minimum spacings or minimum line widths, to increase the likelihood that the finished integrated circuit functions properly in spite of different manufacturing effects. These design rules can be thought of as guidelines for a layout to circumvent process limitations.

It is advantageous to use such design rules because they simplify the layout process by hiding the complexity of the photolithography process. Design rules can be thought of as transforming a continuous problem into a discrete problem. Moreover, design rules can be easily verified by checking dimensions in the layout, such as minimum spacing between shapes.

However, the use of design rules can lead to sub-optimal layouts. For example, a design rule may specify a minimum spacing between specific shapes. However, a circuit designed using this minimum spacing may only function properly for a narrow range of variations in the manufacturing process. It may be preferable to use a larger spacing between shapes whenever possible to improve "process latitude".

For this reason, some foundries have "recommended rules" to improve process latitude. The layout designer/tool uses these recommended rules in addition to standard design rules during the cell generation process to improve process latitude. The layout designer/tool attempts to satisfy these recommended rules. However, unlike standard design rules, they are not required to be satisfied. The layout designer/tool must relax minimum spacing, width and/or size between layout shapes to implement recommended rules. However, if recommended rules applied everywhere, they can lead to unnecessary expansion of the layout. The designer also has to make tradeoffs between recommended rules.

Hence, what is needed is a method and an apparatus for optimizing the spacing, width and/or size of layout shapes in order to enhance process latitude.

Note that in addition to the process latitude for standard design rules, there can be "fighter design rules" that decrease process latitude compared to standard design rules. There can also be "relaxed rules", which increase process latitude compared to the standard design rules. Note that a recommended rule is a special case of a relaxed rule with a fixed value. Relaxed rules can allow for multiple values.

SUMMARY

One embodiment of the invention provides a system that simulates effects of a manufacturing process on an integrated circuit to enhance process latitude and/or reduce layout size. During operation, the system receives a representation of a target layout for the integrated circuit, wherein the representation defines a plurality of shapes that comprise the target layout. Next, the system simulates effects of the manufacturing process on the target layout to produce a simulated printed image for the target layout. The system then identifies problem areas in the specification that do not meet a specification. Next, the system moves corresponding shapes in the target layout to produce a new target layout for the integrated circuit, so that a simulated printed image of the new target layout meets the specification.

Note that the above-described process differs from optical proximity correction. Optical proximity correction modifies a layout to compensate for optical effects so that the actual printed layout matches a target layout. In contrast, the above-described process moves shapes within the target layout to produce a new target layout that has better process latitude.

In a variation on this embodiment, moving the corresponding shapes in the target layout involves optimizing process latitude for the target layout.

In a variation on this embodiment, moving the corresponding shapes in the target layout involves performing a compaction process to minimize layout size.

In a variation on this embodiment; moving the corresponding shapes in the target layout involves providing objectives and/or constraints to the compaction process.

In a variation on this embodiment, moving the corresponding shapes in the target layout involves applying relaxed rules to the problem areas of the target layout to improve process latitude. In a further variation, the relaxed rules include priority values for resolving conflicts between relaxed rules.

In a variation on this embodiment, moving the corresponding shapes in the target layout involves applying relaxed rules to the problem areas of the target layout.

In a variation on this embodiment, the effects of the manufacturing process are simulated over a range of manufacturing parameters.

In a variation on this embodiment, the system additionally uses the simulated printed image to estimate a yield for the target layout.

In a variation on this embodiment, the system performs optical proximity correction (OPC) on the new target layout to produce a modified layout, wherein a simulated printed image of modified layout more closely matches the new target layout than the simulated printed image of the new target layout.

In a variation on this embodiment, the system uses information obtained from examining the simulated printed image to formulate new design rules for the target layout. These new design rules may be more aggressive tightened design rules. Alternatively, these new design rules can merely be different rules that apply to specific cases. For example, a certain pitch may not print well with off-axis illumination, and a new design rule could prohibit this case.

In a variation on this embodiment, the target layout defines a standard cell that is used as a building block for the integrated circuit.

In a variation on this embodiment, the system performs a design rule checking operation on the target layout prior to simulating the effects of the manufacturing process.

BRIEF DESCRIPTION OF THE FIGURES

The file of this patent contains at least one drawing executed in color. Copies of this patent with color drawing (s) will be provided by the Patent and Trademark Office upon request and payment of the necessary fee.

DETAILED DESCRIPTION

Wafer Fabrication Process

Figure 2:
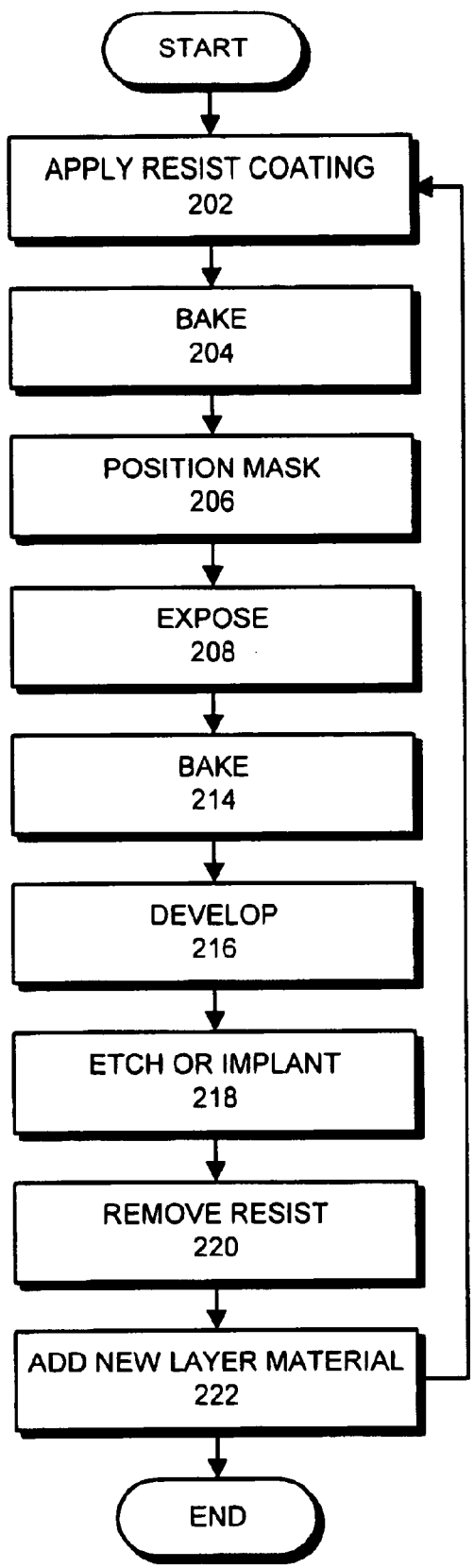
FIG. 2 is a flow chart illustrating the wafer fabrication process in accordance with an embodiment of the invention.

FIG. 2 is a flow chart illustrating the wafer fabrication process in accordance with an embodiment of the invention. The system starts by applying a photoresist layer to the top surface of a wafer (step 202). Next, the system bakes the photoresist layer (step 204). The system then positions a mask over the photoresist layer (step 206), and exposes the photoresist layer through the mask (step 208). Next the system optionally bakes the wafer again (step 214) before developing the photoresist layer (step 216). Next, either a chemical etching or ion implantation step takes place (step 218) before the photoresist layer is removed (step 220). (Note that in the case of a lift-off process, a deposition can take place.) Finally, a new layer of material can be added and the process can be repeated for the new layer (step 222).

Design and Manufacturing Process

Figure 3:
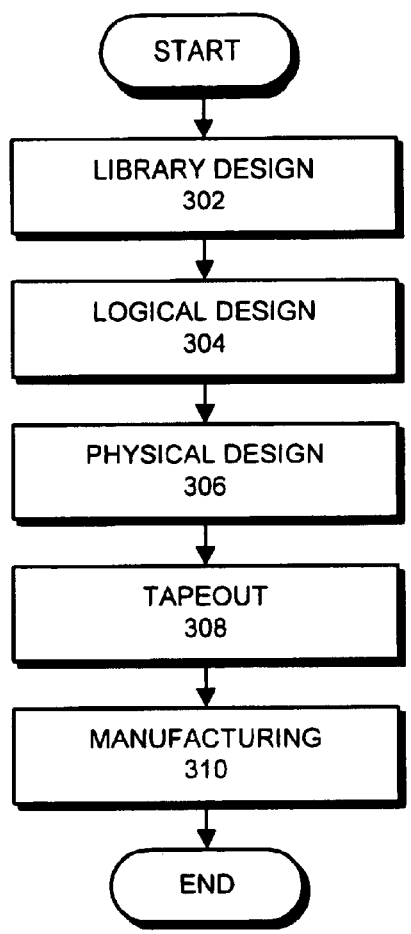
FIG. 3 is a flow chart illustrating the design process and the manufacturing process for an integrated circuit in accordance with an embodiment of the invention.

FIG. 3 is a flow chart illustrating the design process and the manufacturing process for an integrated circuit in accordance with an embodiment of the invention. The design process begins with a library design process (step 302). During the library design process, basic building blocks are created, such as standard cells, memory blocks (or compilers), I/O cells, and data path cells (or compilers).

Next, the logical design process (step 304) takes place. During the logical design process, functionality for the integrated circuit is defined, partitioned and verified. The output of the logical design process is a gate-level netlist.

This gate-level netlist is fed through a physical design process that converts the logical design into a physical implementation (step 306). Note that this physical implementation can include cells from cell libraries or other cells.

Next, a tapeout process takes place (step 308) in which a number of operations occur. Layout finishing is performed to merge abstracts with the routed layout, and to insert dummy structures and manufacturing patterns into the layout. The system also extracts devices, checks design rules at the device level and performs mask corrections as necessary.

Finally, the mask(s) resulting from the layout are fed through a manufacturing process (e.g. the process of FIG. 1), which manufactures the integrated circuit from the layout (step 310).

Standard Cell

Figure 4:
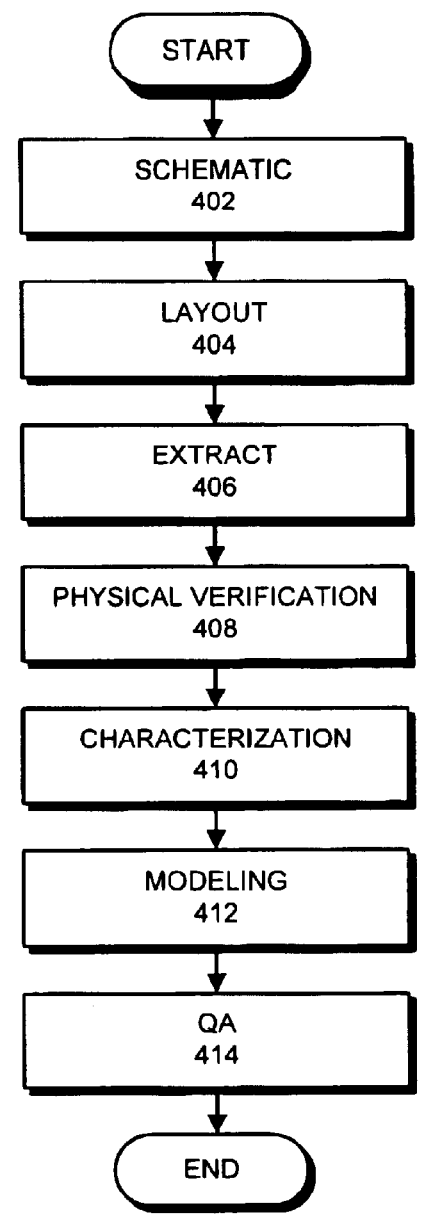
FIG. 4 is a flow chart illustrating how a standard cell is designed in accordance with an embodiment of the invention.

FIG. 4 is a flow chart illustrating how a standard cell is created during the library design process (step 302 of FIG. 3) in accordance with an embodiment of the invention.

First, a schematic for the circuit is manually created with a schematic tool, such as CADENCE COMPOSER (step 402). During this process, netlist connectivity and transistor size are specified. A circuit simulation is also performed to verify functionality and performance. Next, a layout is generated from the netlist (step 404). This involves translating the netlist into a layout. Note that this layout must meet a set of design rules.

The system then performs an extraction operation (step 406) to extract transistor size, as well as capacitance and resistance of wires and devices. The output of this extraction process is a netlist with resistance and capacitance parameters.

Next, a physical verification operation takes place (step 408) to check design rules and to ensure that the transistor network is consistent with the layout.

The system then performs a characterization operation (step 410), which simulates the cell then extracts propagation delays and power dissipation for the circuit.

Next, a modeling process translates timing and power data into formats needed by design tools (step 412).

Finally, a quality assurance (QA) operation checks consistency of the simulation models (step 414).

Note that some of the above-described steps are optional depending on specific details of a given manufacturing process. Moreover, some of the above-described operations can be performed in parallel.

Layout Generation and Enhancement

Figure 5:
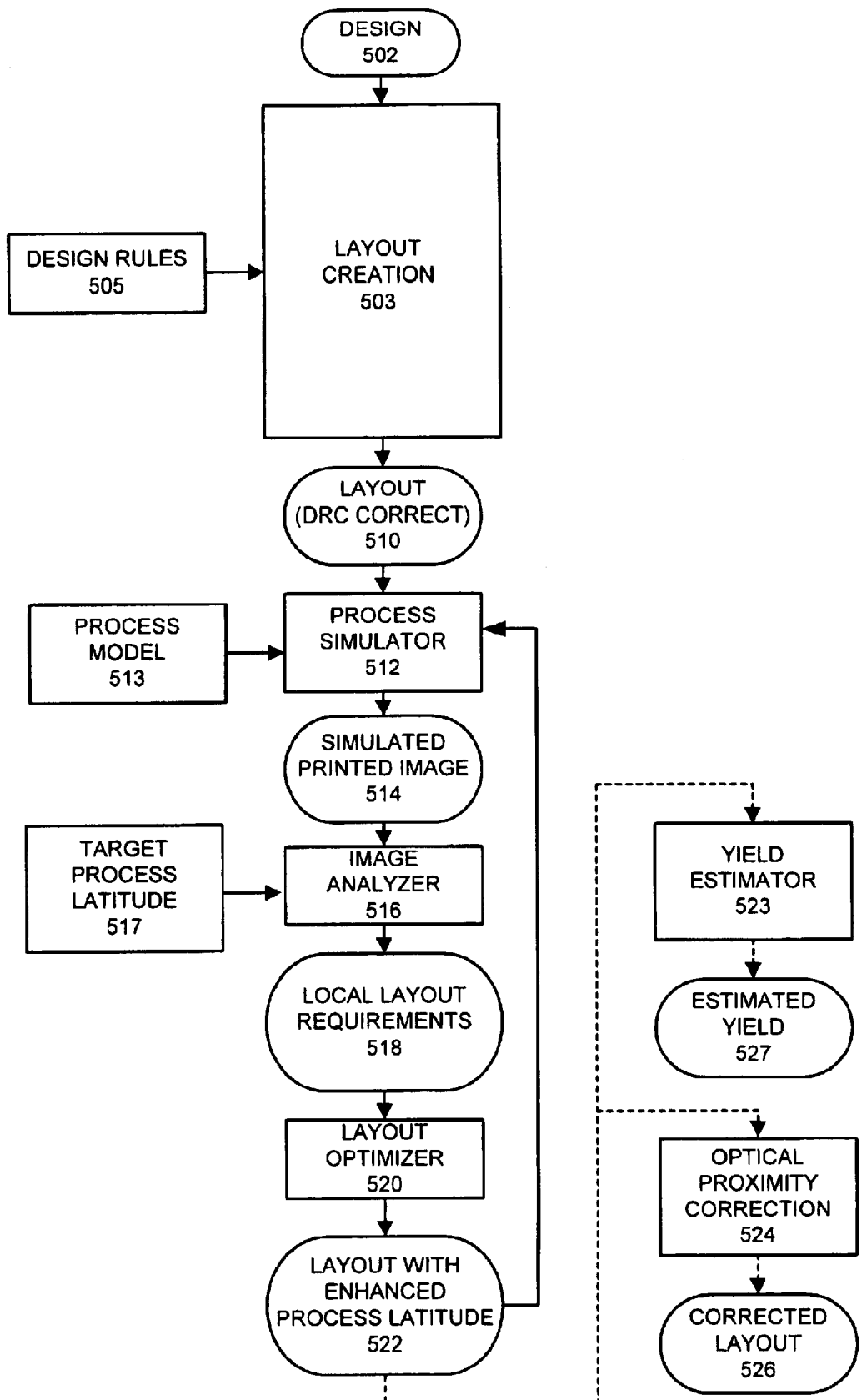
FIG. 5 is a flow chart illustrating how a layout is generated and enhanced in accordance with an embodiment of the invention.

FIG. 5 is a flow chart illustrating how a layout is generated and enhanced in accordance with an embodiment of the invention. Note that this process can be applied to the design of a standard cell for a library as well as to the design of an entire layout. Layout creation process 503 takes as input a design 502 and ensures that the resulting layout 510 satisfies a set of design rules 505. The design 502 may be expressed in a number of suitable input formats ranging from SPICE netlists to VHDL or RTL descriptions of the design.

Figure 1:
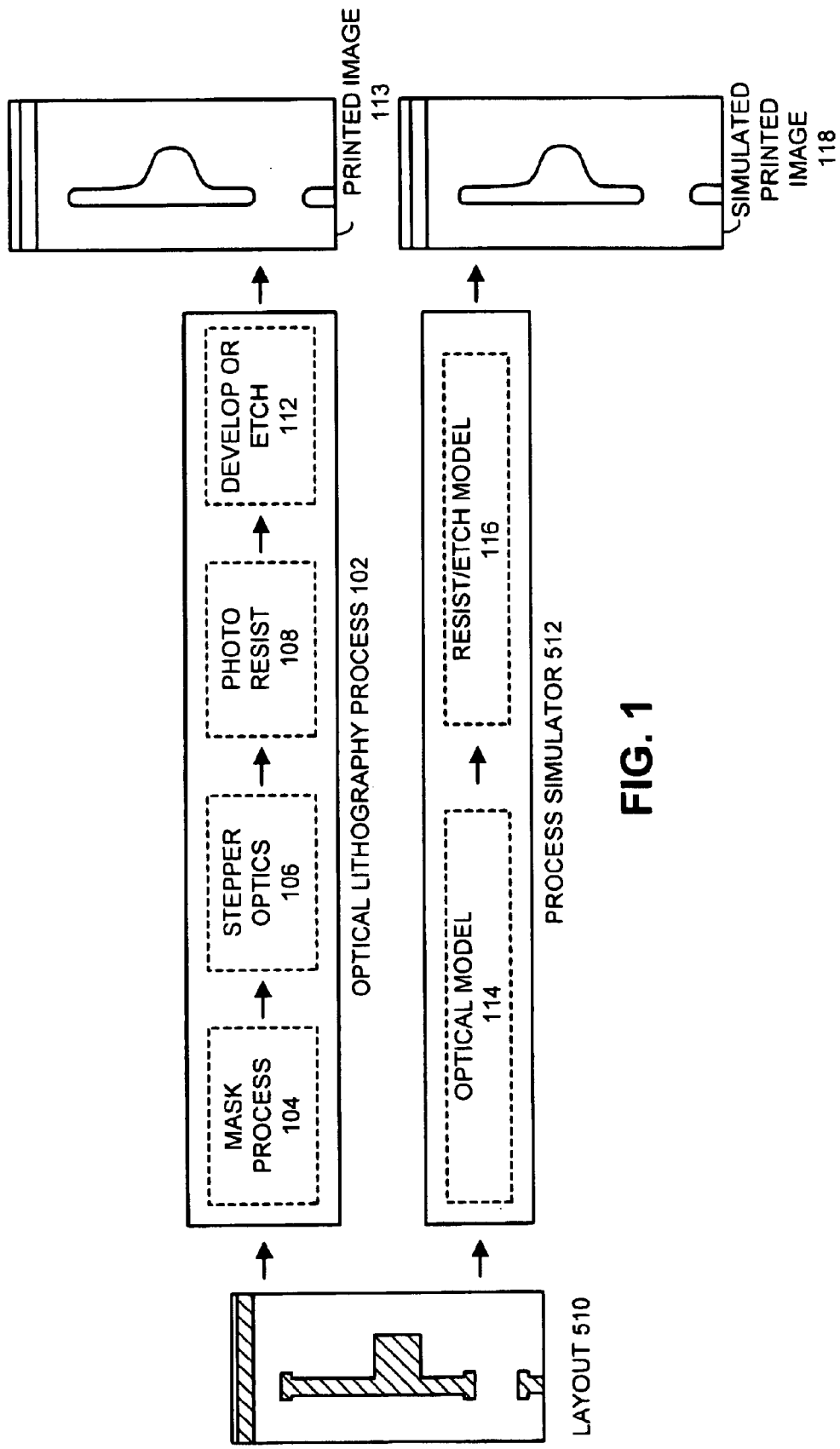
FIG. 1 illustrates how the manufacturing process is simulated in accordance with an embodiment of the invention.

Next, layout 510 feeds through process simulator 512. This process simulator 512 uses a process model 513 to generate a simulated printed image 514 for the layout. Note that this simulated printed image 514 may include a number of printed images generated using different process parameters. In this way, process simulator 512 can determine how the printed image will be affected by changes in process parameters. For example, the simulation could be performed for a range of defocus conditions. Note that FIG. 1 illustrates how process simulator 512 can make use of an optical model 114 as well as other models including a resist/etch model 116 to produce a simulated printed image 118.

Figure 7:
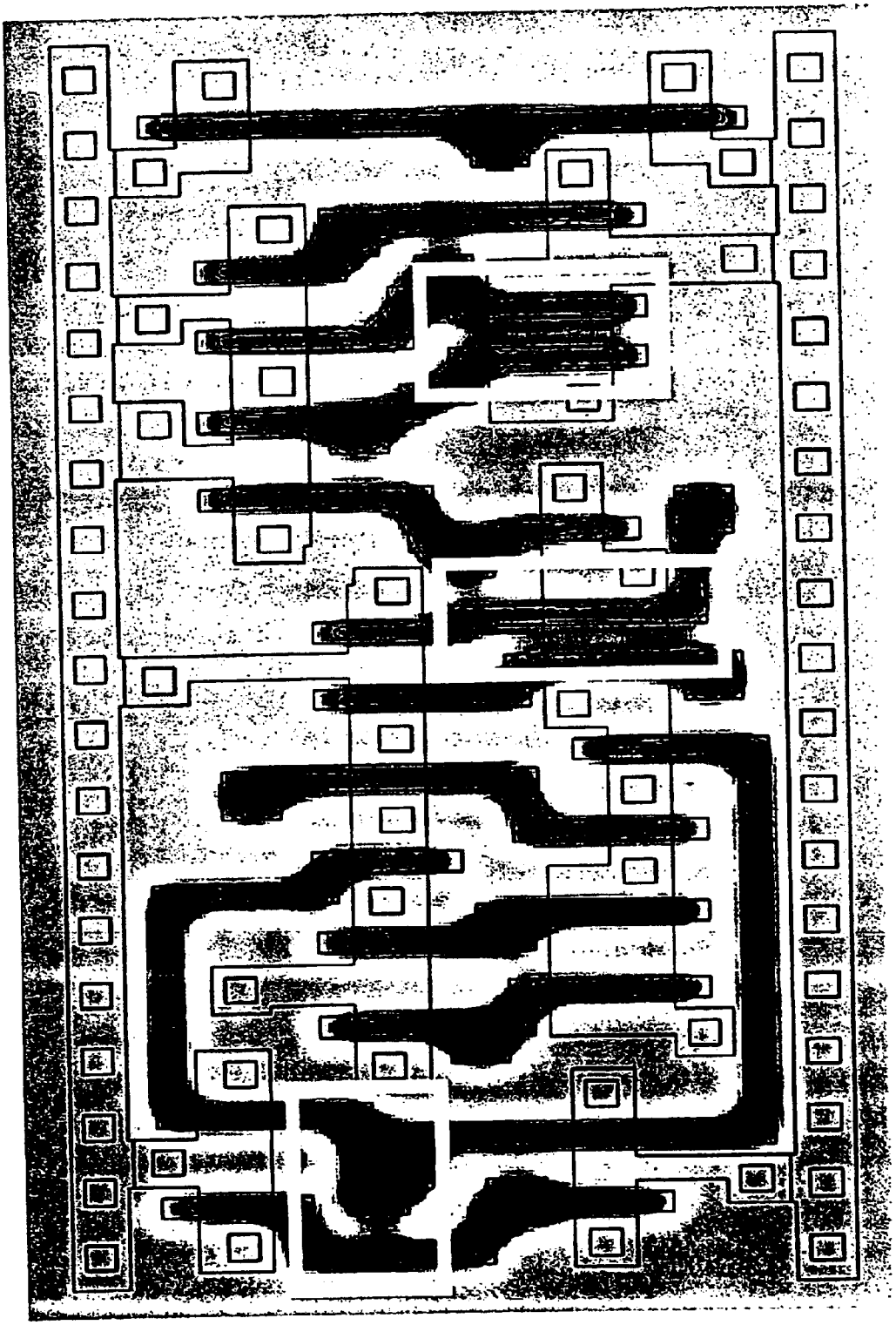
FIG. 7 illustrates an exemplary printed image including problem areas in accordance with an embodiment of the invention.

Next, an image analyzer 516 uses the simulated printed image 514 to generate local layout requirements 518 to optimize the process latitude and/or layout characteristics, e.g. area. These additional constraints 518 feed into a layout optimizer 520, which further optimizes the layout. Note that this further optimization can involve identifying problem areas in the layout as is illustrated in FIG. 7.

In one case, layout optimizer 520 attempts to update the layout to produce a layout 522 with enhanced process latitude. In this case, the goal in producing enhanced layout 522 could be to achieve a pre-determined target process latitude 517 regardless of the area impact. Hence, the layout optimizer 520 relaxes the layout to achieve the target process latitude.

In another case, the layout area is a fixed constraint and the layout optimizer 520 increases the process latitude as much as possible without changing the area. In this case, optimizing the global process latitude while maintaining the target area may result in decreased process latitude in some regions of the layout.

In yet another case, layout optimizer 520 additionally performs a compaction operation on the layout.

At a later time, enhanced layout 522 can be further refined through optical proximity correction 524 (as well as phase shifting, if desired) to produce a corrected layout 526.

Furthermore, layout 522 can additionally feed into yield estimator 523 to produce an estimated yield 527 for the integrated circuit.

Note that the above-described simulation process can be applied to the enhanced layout in an iterative fashion to further improve process latitude for the layout (as is indicated by the arrow feeding enhanced layout 522 back into process simulator 512).

Comparing OPC and Process-Compliant Layout Optimization

Figure 6:
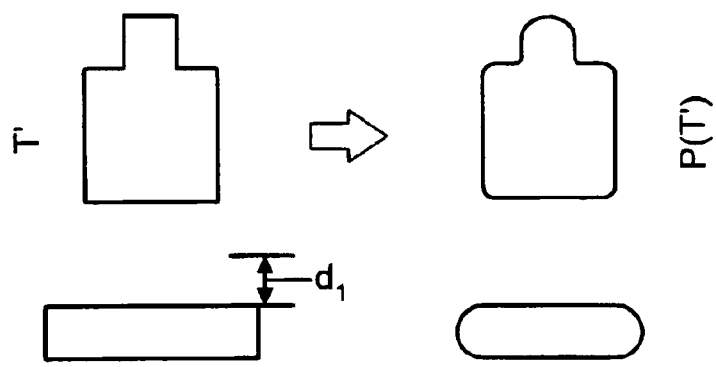
FIG. 6 illustrates the difference between optical proximity correction and process-complaint layout optimization in accordance with an embodiment of the invention.
Figure 6:
Figure 6:
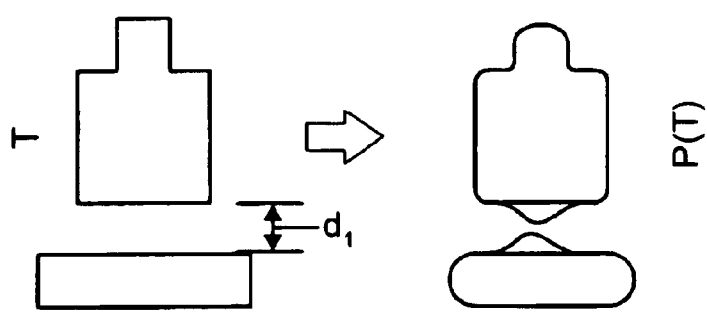
Figure 6:
Figure 6:
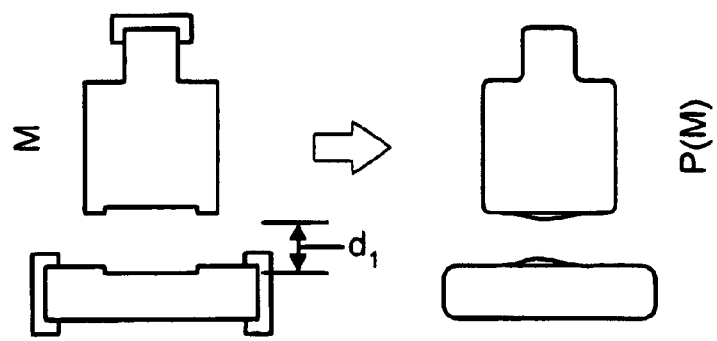

FIG. 6 compares OPC with process-compliant layout optimization in accordance with the invention. OPC starts with a target layout T and produces a modified layout M that includes modifications to edges of shapes to compensate for optical effects during the manufacturing process. This results in a printed image P(M) which is closer to the target layout T than the printed image, P(T), of the unmodified target layout T.

In contrast, the process compliant layout optimization uses simulation results to produce a new target layout T'. Within this new target layout T' shapes have been moved to improve process latitude, specifically in the original layout T, the two features were a distance $d_1$ apart, but in the new target layout the features are a spaced further apart. As such, the new target layout T' is expected to have greater process latitude than the original layout T, this can be seen somewhat by the improved printed image P(T') that shows less likelihood that the two features will bridge together than shown in P(T).

OPC seeks to produce a modified image M that results in a printed image P(M) that closely matches the target image T, whereas process-compliant layout optimization produces a new and different target image T' so that the resulting printed image P(T') has better process latitude when compared against P(T) (and P(M)).

Also note that OPC can be subsequently applied to the new target image T' to produce a new layout M' (not shown) that in turn produces a printed image P(M') (not shown) that more closely matches the new target layout T' than P(T').

Example Printed Image

FIG. 7 illustrates an exemplary simulated printed image in accordance with an embodiment of the invention. This simulated printed image has problem areas that are highlighted by white boxes. Note that relaxed rules are only applied to shapes within these problem areas, and not to other areas in the layout.

In each of these problem areas, there is potential bridging between the printed lines. Hence, process latitude can be improved by moving the edges of the features so that a larger space is created between the features.

Alternative Embodiments

The foregoing descriptions of embodiments of the invention have been presented only for purposes of illustration and description. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

For example, a number of additional variations on the above-described process for selectively applying to problem areas are possible. In one embodiment, the process applies standard design rules to the entire layout and only applies relaxed rules as needed to local areas. Alternatively, the process can apply standard design rules (or relaxed rules) to the entire layout, and can then apply new rules, which can be tighter or looser than the original rules, to local areas.

Moreover, the data structures and code described in this detailed description can be stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet and the computer instruction signals may include the programs being accessed across the network.

Conclusion

The following description is presented to enable any person skilled in the art to make and use the invention, and is provided in the context of a particular application and its requirements. Various modifications to the disclosed embodiments will be readily apparent, and the general principles defined herein may be applied to other embodiments and applications without departing from the spirit and scope of the invention. Thus, the invention is not limited to the embodiments shown, but is to be accorded the widest scope consistent with the principles and features disclosed herein.

What is claimed is:

1. A method for simulating effects of a manufacturing process on an integrated circuit to enhance process latitude and/or reduce layout size, comprising:
   receiving a representation of a target layout for the integrated circuit, wherein the representation defines a plurality of shapes that comprise the target layout;
   simulating effects of a manufacturing process on the target layout to produce a simulated printed image for the target layout;
   identifying problem areas in the simulated printed image that do not meet a specification; and
   moving corresponding shapes in the target layout to produce new target layout for the integrated circuit, wherein moving the corresponding shapes in the target layout involves applying relaxed rules to the problem areas of the target layout to achieve an enhanced process latitude regardless of the area impact and applying standard design rules on remaining areas of the target layout, wherein the relaxed rules include priority values for resolving conflicts between relaxed rules whereby a simulated printed image of the new target layout meets the specification.

2. The method of claim 1, further comprising performing optical proximity correction (OPC) on the new target layout to produce a modified layout, wherein a simulated printed image of modified layout more closely matches the new target layout than the simulated printed image of the new target layout.

3. The method of claim 1, wherein moving the corresponding shapes in the target layout involves optimizing process latitude.

4. The method of claim 1, wherein moving the corresponding shapes in the target layout involves performing a compaction process to minimize layout size.

5. The method of claim 4, wherein moving the corresponding shapes in the target layout involves providing at least one of objectives and constraints to the compaction process.

6. The method of claim 1, wherein the effects of the manufacturing process are simulated over a range of manufacturing parameters.

7. The method of claim 1, wherein the method further comprises using the simulated printed image to estimate a yield for the target layout.

8. The method of claim 1, further comprising using information obtained from examining the simulated printed image to formulate new design rules for the target layout.

9. The method of claim 1, wherein the target layout defines a standard cell that is used as a building block for the integrated circuit.

10. The method of claim 1, further comprising performing a design rule checking operation on the target layout prior to simulating the effects of the manufacturing process.

11. A computer-readable storage medium storing instructions that when executed by a computer cause the computer to perform a method for simulating effects of a manufacturing process on an integrated circuit to enhance process latitude and/or reduce layout size, the method comprising:
   receiving a representation of a target layout for the integrated circuit;
   wherein the representation defines a plurality of shapes that comprise the target layout;
   simulating effects of the manufacturing process on the target layout to produce a simulated printed image for the target layout;
   identifying problem areas in the simulated printed image that do not meet a specification; and
   moving corresponding shapes in the target layout to produce new target layout for the integrated circuit, wherein moving the corresponding shapes in the target layout involves applying relaxed rules to the problem areas of the target layout to achieve an enhanced process latitude regardless of the area impact and applying standard design rules on remaining areas of the target layout, wherein the relaxed rules include priority values for resolving conflicts between relaxed rules whereby a simulated printed image of the new target layout meets the specification.

12. The computer-readable storage medium of claim 11, wherein the method further comprises performing optical proximity correction (OPC) on the new target layout to produce a modified layout, wherein a simulated printed image of modified layout more closely matches the new target layout than the simulated printed image of the new target layout.

13. The computer-readable storage medium of claim 11, wherein moving the corresponding shapes in the target layout involves optimizing process latitude for the target layout.

14. The computer-readable storage medium of claim 11, wherein moving the corresponding shapes in the target layout involves performing a compaction process to minimize layout size.

15. The computer-readable storage medium of claim 14, wherein moving the corresponding shapes in the target layout involves providing at least one of objectives and constraints to the compaction process.

16. The computer-readable storage medium of claim 11, wherein the effects of the manufacturing process are simulated over a range of manufacturing parameters.

17. The computer-readable storage medium of claim 11, wherein the method further comprises using the simulated printed image to estimate a yield for the target layout.

18. The computer-readable storage medium of claim 11, wherein the method further comprises using information obtained from examining the simulated printed image to formulate new design rules for the target layout.

19. The computer-readable storage medium of claim 11, wherein the target layout defines a standard cell that is used as a building block for the integrated circuit.

20. The computer-readable storage medium of claim 11, wherein the method further comprises performing a design rule checking operation on the target layout prior to simulating the effects of the manufacturing process.

21. An apparatus for simulating effects of a manufacturing process on an integrated circuit to enhance process latitude and/or reduce layout size, comprising:

a receiving mechanism that is configured to receive a representation of a target layout for the integrated circuit;

wherein the representation defines a plurality of shapes that comprise the target layout;

a simulation mechanism that is configured to simulate effects of the manufacturing process on the target layout to produce a simulated printed image for the target layout; and an optimization mechanism that is configured to, identify problem areas in the simulated printed image that do not meet a specification, and to move corresponding shapes in the target layout to produce new target layout for the integrated circuit, wherein moving the corresponding shapes in the target layout involves applying relaxed rules to the problem areas of the target layout to achieve an enhanced process latitude regardless of the area impact and applying standard design rules on remaining areas of the target layout, wherein the relaxed rules include priority values for resolving conflicts between relaxed rules whereby a simulated printed image of the new target layout meets the specification.

22. The apparatus of claim 21, further comprising an optical proximity correction (OPC) mechanism that is configured to perform OPC on the new target layout to produce a modified layout, wherein a simulated printed image of modified layout more closely matches the new target layout than the simulated printed image of the new target layout.

23. The apparatus of claim 21, wherein the optimization mechanism is configured to optimize process latitude for the target layout.

24. The apparatus of claim 21, wherein the optimization mechanism is configured to perform a compaction process to minimize layout size.

25. The apparatus of claim 24, wherein the optimization mechanism is configured to move the corresponding shapes in the target layout by providing at least one of objectives and constraints to the compaction process.

26. The apparatus of claim 21, wherein the simulation mechanism is configured to simulate effects of the manufacturing process over a range of manufacturing parameters.

27. The apparatus of claim 21, wherein the optimization mechanism is additionally configured to estimate a yield for the target layout.

28. The apparatus of claim 21, wherein the optimization mechanism is configured to use information obtained from examining the simulated printed image to formulate new design rules for the target layout.

29. The apparatus of claim 21, wherein the target layout defines a standard cell that is used as a building block for the integrated circuit.

30. The apparatus of claim 21, further comprising a design rule checking mechanism that is configured to perform a design rule checking operation on the target layout prior feeding the target layout to the simulation mechanism.

31. A mask to be used in an optical lithography process, wherein the mask is created through a method that simulates effects of a manufacturing process on an integrated circuit to enhance process latitude and/or reduce layout size, the method comprising:

receiving a representation of a target layout for the integrated circuit;

wherein the representation defines a plurality of shapes that comprise the target layout;

simulating effects of the manufacturing process on the target layout to produce a simulated printed image for the target layout;

identifying problem areas in the simulated printed image that do not meet a specification; and moving corresponding shapes in the target layout to produce new target layout for the integrated circuit, wherein moving the corresponding shapes in the target layout involves applying relaxed rules to the problem areas of the target layout to achieve an enhanced process latitude regardless of the area impact and applying standard design rules on remaining areas of the target layout, wherein the relaxed rules include priority values for resolving conflicts between relaxed rules whereby a simulated printed image of the new target layout meets the specification.

32. An integrated circuit created through a method that simulates effects of a manufacturing process on an integrated circuit to enhance process latitude and/or reduce layout size, the method comprising:

receiving a representation of a target layout for the integrated circuit;

wherein the representation defines a plurality of shapes that comprise the target layout;

simulating effects of the manufacturing process on the target layout to produce a simulated printed image for the target layout;

identifying problem areas in the simulated printed image that do not meet a specification; and moving corresponding shapes in the target layout to produce new target layout for the integrated circuit, wherein moving the corresponding shapes in the target layout involves applying relaxed rules to the problem areas of the target layout to achieve an enhanced process latitude regardless of the area impact and applying standard design rules on remaining areas of the target layout, wherein the relaxed rules include priority values for resolving conflicts between relaxed rules whereby a simulated printed image of the new target layout meets the specification.

* * * * *